(12) United States Patent
Gaitan et al.

(10) Patent No.: US 8,421,306 B2
(45) Date of Patent: Apr. 16, 2013

(54) SYSTEM AND METHOD FOR CAUSING CAVITATION IN A LIQUID METAL

(75) Inventors: Dario Felipe Gaitan, Nevada City, CA (US); Robert A. Hiller, Grass Valley, CA (US); Corey Scott, Grass Valley, CA (US); Ernest E. Flores, Grass Valley, CA (US)

(73) Assignee: Impulse Devices, Inc., Grass Valley, CA (US)

( * ) Notice: Subject to any disclaimer, the term of this patent is extended or adjusted under 35 U.S.C. 154(b) by 44 days.

(21) Appl. No.: 12/832,061

(22) Filed: Jul. 7, 2010

(65) Prior Publication Data
US 2012/0145556 A1    Jun. 14, 2012

Related U.S. Application Data

(60) Provisional application No. 61/270,216, filed on Jul. 7, 2009.

(51) Int. Cl.
*H01L 41/08* (2006.01)
*C25D 5/34* (2006.01)

(52) U.S. Cl.
USPC .................. 310/311; 205/205; 205/210

(58) Field of Classification Search .............. None
See application file for complete search history.

(56) References Cited

U.S. PATENT DOCUMENTS
2010/0200417 A1* 8/2010 Callahan et al. ............ 205/210
* cited by examiner

*Primary Examiner* — Mark Budd
(74) *Attorney, Agent, or Firm* — EcoTech Law Group, P.C.

(57) ABSTRACT

Systems and methods for achieving cavitation at high static pressures which may be used in acoustic applications and research such as in liquid metal resonators. Novel preparation and electroplating methods are disclosed to improve boundary layer conditions. A chemical cleaning loop for containment and treatment for oxide removal and to develop a dynamic system for chemically treating liquid metal disposed in a liquid metal loop is also described. A liquid metal handling loop for containment and treatment is provided to maintain cleanliness of bulk liquid metal.

19 Claims, 17 Drawing Sheets

SYSTEM AND METHOD FOR CAUSING CAVITATION IN A LIQUID METAL

RELATED APPLICATIONS

The present application claims the benefit and priority of Provisional Application Ser. No. 61/270,216, entitled "Cavitation of liquid gallium in high static pressure resonators methods and apparatus," filed on Jul. 7, 2009, which is hereby incorporated by reference in its entirety.

STATEMENT AS TO SPONSORED RESEARCH OR DEVELOPMENT

The present invention was made at least in part with U.S. Government support under Contract No. W9113M-07-C-0178, which was awarded by the U.S. Space and Missile Defense Command and contracted to the present assignee. Accordingly, the Government may have certain rights in the subject invention

TECHNICAL FIELD

The present application generally relates to systems and methods for causing cavitation in fluids, and more specifically, to systems and methods and preparations that allow, sustain and control cavitation in liquid metals under various conditions and operating pressures.

BACKGROUND

Acoustic fields can be applied to fluids (e.g., liquids, gases) within resonator vessels or chambers. For example, standing waves of an acoustic field can be generated and set up within a resonator containing a fluid medium. The acoustic fields can be described by three-dimensional scalar fields conforming to the driving conditions causing the fields, the geometry of the resonator, the physical nature of the fluid supporting the acoustic pressure oscillations of the field, and other factors.

One common way to achieve an acoustic field within a resonator is to attach acoustic drivers to an external surface of the resonator. The acoustic drivers are typically electrically-driven using acoustic drivers that convert some of the electrical energy provided to the drivers into acoustic energy. The energy conversion employs the transduction properties of the transducer devices in the acoustic drivers. For example, piezo-electric transducers (PZT) having material properties causing a mechanical change in the PZT corresponding to an applied voltage are often used as a building block of electrically-driven acoustic driver devices. Sensors such as hydrophones can be used to measure the acoustic pressure within a liquid, and theoretical and numerical (computer) models can be used to measure or predict the shape and nature of the acoustic field within a resonator chamber.

If the driving energy used to create the acoustic field within the resonator is of sufficient amplitude, and if other fluid and physical conditions permit, cavitation may take place at one or more locations within a liquid contained in an acoustic resonator. During cavitation, vapor bubbles, cavities, or other voids are created at certain locations at times within the liquid where the conditions (e.g., pressure) at said certain locations and times allow for cavitation to take place.

Under certain conditions, the acoustic action of a transducer and the resonance chamber may set up an acoustic field within the fluid in the chamber that is of sufficient strength and configuration to cause acoustic cavitation within a region of the resonance chamber. Specifically, under suitable conditions, acoustic cavitation of the fluid in the chamber may cause bubbles or acoustically-generated voids, as described above and known to those skilled in the art, to form within one or more regions of the chamber. The cavitation usually occurs at zones within the chamber that are subjected to the most intense (highest amplitude) acoustic fields therein.

Other ways have been known to cause acoustic cavitation in liquids and similar materials. For example, a high-intensity acoustic horn comprising a special metallic horn-shaped tool at one end that is driven by an electrical driver can be used to impart sufficient acoustic energy into a fluid so as to cause cavitation voids in a region of the fluid.

The detailed description below provides numerous embodiments and benefits of applying acoustical energy and cavitation to a suitable material in order to cause and sustain cavitation in the same.

SUMMARY

Aspects of the present disclosure relate generally to a system and a method for achieving and sustaining high pressure cavitation in liquid metals. More particularly, this invention relates to techniques, apparatus, methods, and conditions for operating and using the same that are suitable for producing and optimizing cavitation in liquid Gallium and Gallium alloys and other metals and metallic liquids under high static pressures. In addition, the present disclosure describes systems and methods for provision of a cavitation resonator capable of causing cavitation in liquid metal and a liquid metal handling loop, which includes elements to maintain purity of the liquid metal to be cavitated. In some aspects, the present system avoids or minimizes or reduces potential oxidization effects, which can have a detrimental effect on the ability to cause, sustain, or control cavitation in liquid metal.

Some embodiments are directed to A method for causing cavitation of a liquid metal in an acoustic resonator, comprising cleaning an interior surface of said resonator; removing oxide substances from said interior surface of said resonator; and plating said interior surface with a same metal as said liquid metal to be cavitated.

Other embodiments are directed to a system for causing cavitation in a liquid metal, comprising an acoustic resonator constructed substantially of an enclosed solid metal shell having an internal surface defining an interior volume thereof for holding said liquid metal, said resonator shell having a plurality of penetration ports therein; at least one acoustic driver acoustically coupled to said resonator for causing an acoustic field to be generated within said interior volume of the resonator; a liquid metal fluid handling loop in fluid communication with said resonator by way of said plurality of penetration ports; said fluid handling loop comprising a pressure source for driving said liquid metal through said loop a pressure monitoring apparatus for monitoring a static pressure of said liquid metal within said system; and a filter for filtering unwanted substances from said liquid metal; and a chemical processing reservoir for chemically treating said liquid metal within said system so as to condition said liquid metal to allow cavitation therein.

BRIEF DESCRIPTION OF THE DRAWINGS

For a fuller understanding of the nature and advantages of the present concepts, reference is be made to the following detailed description of preferred embodiments and in connection with the accompanying drawings, in which.

DETAILED DESCRIPTION

Figure 1:
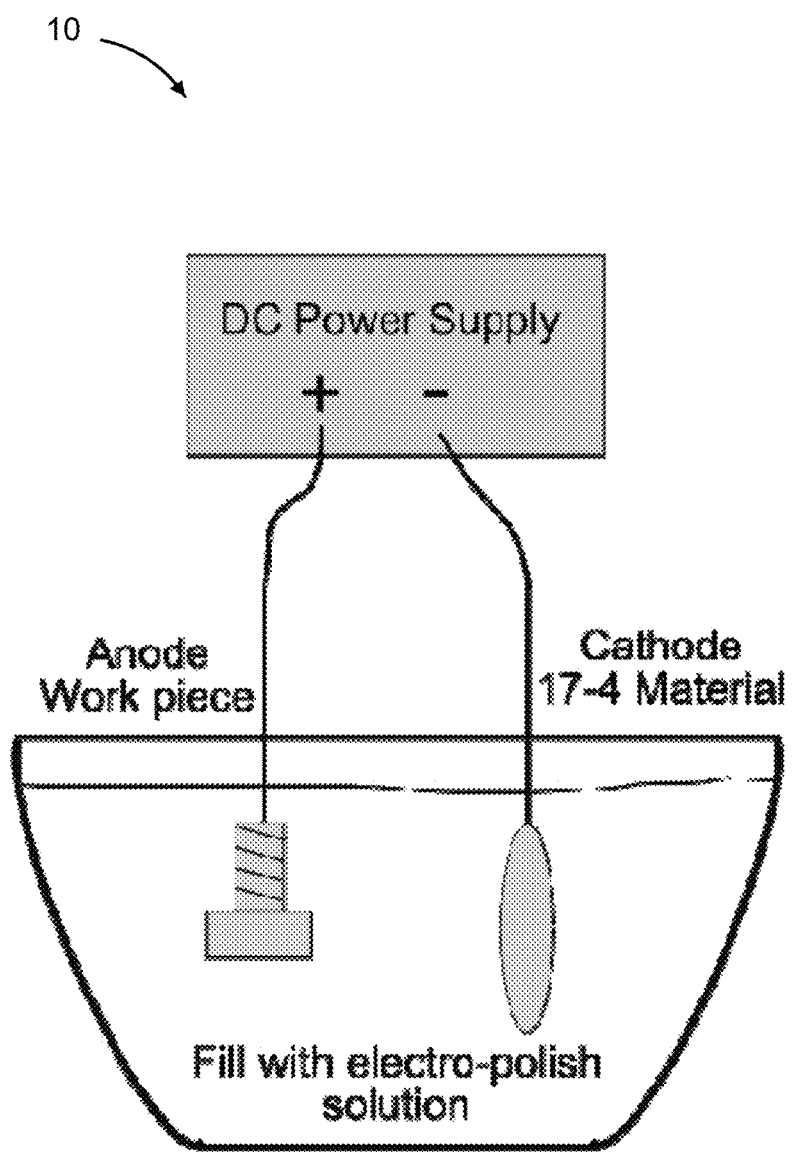
FIG. 1 illustrates the disposition of a small workpiece such as the distal ends of a plug or valve.

In some situations it is desirable to provide an acoustic resonator which can efficiently transfer power from the drivers and shell to a liquid metal therein with minimal energy loss or damping. Until now it has not been possible to achieve large amplitude acoustic standing waves and high quality factors (Q) in part due to metal oxide boundary layers and/or colloids, trapped gasses, and bulk/shell mode impedance mismatching, which dampen and absorb the acoustic pressure field.

One metal that can be used in liquid form in an acoustic cavitation resonator is gallium (Ga). Gallium is an element that is used in some forms in the semiconductor and electronics industries. Gallium is generally recovered as a by-product from Bayer-process liquors containing sodium aluminate and subsequently purified. The purification may be carried out by electro-winning, hydro-chemical, vacuum-refining and zone-refining processes.

Oxidation can occur when gallium is subjected to oxygen, or air. Gallium oxidizes into some oxidation states, for example:

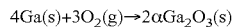

$$4Ga(s)+3O_2(g) \rightarrow 2\alpha Ga_2O_3(s)$$

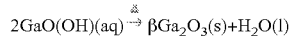

$$2GaO(OH)(aq) \xrightarrow{\Delta} \beta Ga_2O_3(s)+H_2O(l)$$

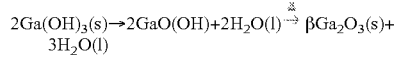

$$2Ga(OH)_3(s) \rightarrow 2GaO(OH)+2H_2O(l) \xrightarrow{\Delta} \beta Ga_2O_3(s)+3H_2O(l)$$

The oxidation of gallium gives rise to two atomic phases, α and β, of gallium(III) oxide, under typical operating conditions. The α variant is denser and β is less dense than liquid gallium. In a clean, inert environment, gallium could be segregated from the oxides by drawing from the bulk. The inventors have found further complications associated with the handling of gallium, unless certain cleanliness procedures are adhered. Embodiments hereof address these difficulties and provide a system that allows for the processing and use of liquid forms of gallium and similar metals in acoustic cavitation systems.

As a first matter, metal oxides tend to bind and/or combine with intermetallic compounds and gasses the oxide comes into contact with (e.g., trapped gasses, such as, nitrogen or argon). Even under conditions of near high vacuum, gasses tend to get trapped within the gallium vessel and transport system. If gasses are not rigorously evacuated from the cavitator, transport vessel and treatment system, the gasses may become trapped in higher relative elevations of the system due to their buoyancy in the lab's gravitational environment. Also, without proper design and operation, as described below, it may occur that upon filling a system with gallium, gasses may become entombed in one or more areas of the system due to the high density of gallium. For example, gasses may become trapped in overhead recesses within a valve apparatus.

Even modest static friction forces may cause gas bubbles to become trapped in a liquid gallium processing and cavitation system, so that the those skilled in the art would appreciate the usefulness of the present apparatus and ways of making and using the same to avoid such problems. For instance, without attention to the design and operation aspects discussed herein, surface defects may statically arrest gas bubbles from rising to the surface, even under vacuum, and may therefore interfere with or impede the ability to cause, sustain, or control the cavitation of the liquid metal in the apparatus. If not properly designed and operated, the condition of a cavitation system may be worsened by large angles of inclination and overhead environments. Gas bubble size responds to surrounding pressures, in accordance with Boyle's law. Embodiments of the present system and method eliminates the need for substantial physical agitation to displace trapped gasses adhered to a surface wall.

Proper equipment construction and material selection, according to the present teachings, may mitigate corrosion and the formation of unwanted oxides and sludge in the system. Embodiments hereof employ metals with robust chromium oxide passivation layers, such 316 stainless steel and avoid or minimize the use of more pure metals in their construction, which may create intermetallic alloys that can produce sludge and clog the system thereby dampening the acoustic pressure waves. Such sludge may collect underneath the gallium and in dynamic areas of restriction.

Metal salts are a product of some traditional chemical cleaning methods employed to purify gallium in-situ. Accordingly, various embodiments employ a design that avoids causing high concentrations of metal salts (aqueous types), especially in areas of large temperature gradients or fields.

Seals, O-rings, and valve packing material are selected based on several criterion. In some embodiments, the selection of materials employs materials that are substantially inert to gallium and that are resistant to strong bases and acids.

Additionally, some embodiments employ materials with low out-gassing and porosity, e.g. as to polymers. While polymers may be treated to decrease out-gassing over time, porosity can continue to introduce hydrogen, oxygen, nitrogen and water vapor into a system. Some contaminants are problematic in their initial state and others become reactants having chemical products that can reduce cavitation efficiency. For example, gallium is substantially inert to water except in the presence of oxygen. Therefore, the ability to maintain a high vacuum is a consideration in material selection of the present embodiments, which inhibits or prevents the entrance of vapor molecules, reactants and products to the system.

Some contaminants may produce unwanted effects in a liquid metal cavitation system. For instance, hydrogen generally embrittles steel. As a small molecule, hydrogen occupies vacant interstitial sites within a steel crystal lattice, leading to brittleness. Some present embodiments are designed to operate under pressure, therefore the present system's design and operation minimizes the introduction of factors that may cause steel components to become brittle and weak. Since embrittlement increases as a function of time if allowed to progress, safety margins must be increase within high pressure cavitation systems and resonator chambers to reduce the risk of catastrophic failures under (static) pressure. Since hydrogen may be produced during chemical treatment and during several steps of a resonator's preparation to receive gallium, embodiments of the present system mitigate the production and introduction of hydrogen into the system.

In some situations, acids are used to treat gallium oxide. Such gallium oxide may adhere to nearby gasses, e.g., nitrogen, which them forms an unwanted foamy substance disposed on the surface of the gallium. Oxide foam does not skim off well and protect the remaining bulk of the gallium. The oxide foam may also collect intermetallics including elements leached from stainless steel, such as carbon, sulfur and manganese. The present system is also designed and operated to reduce the production of such intermetallics and to mitigate the effects of oxide materials in the system.

In some embodiments, oxide and other foams are segregated from the cavitator, or otherwise removed, to prevent damping and interference or power coupling between the acoustic drivers and bulk material.

Further aspects of the present disclosure are related to improving the design and performance of liquid metal cavitation systems in the presence of acids. Hydrochloric acid (HCl) chemically can chemically react with gallium oxide to produce gallium chloride, hydrogen gas, and water:

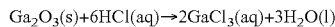

$$Ga_2O_3(s)+6HCl(aq)\rightarrow 2GaCl_3(aq)+3H_2O(l)$$

Within an acoustic cavitation chamber or resonator, oxide and oxide foams, if not abated, may expand and contract in response to standing pressure waves. This may produce an unwanted, and sometimes dramatic, reduction in the Q of a resonator by broadening the frequency response (spreading out the power over a larger frequency bandwidth). Strong acids, such as HCl, may aggressively attack metal oxides, especially if heated, and slowly react with underlying metal. While other approaches may employ acids for surface cleaning, some present embodiments are designed and made with the byproducts of such acids in mind to avoid or reduce the above problems.

Note that the use of vacuum pumps to draw off water from a system may concentrate a mixture (or solution) even though hydrochloric acid has a relatively high vapor pressure. Unreacted HCl may become saturated to an extent that the solute drops out of solution. Solute HCl may become a long term unwanted agent, which the present system and methods avoids or reduces. HCl solid can be difficult to detect within a cavitation or fluid processing system and may return to a highly reactive state in contact with water and water vapor. As reconstituted acid may create hydrogen gas, which may have previously been evacuated, the present system and method address this in various designs and methods hereof as well.

Another aspect addressed by embodiments of the present system and method is directed to preventing or reducing high concentrations of metal salts. Metal salt solutes may become a nucleation site for sludge collection. This may occur near a heat source, such as heat tape or a heating plate in the system. In addition, this sludge may accumulate below the gallium's surface making it difficult to identify, analyze and locate. The sludge differs from surface oxide foam as it usually does not stick to itself and is not easily skimmed off. Accordingly, embodiments hereof are directed to preventing or reducing the buildup of concentrated metal salts.

Various embodiments are directed to cavitation resonator preparation and gallium electroplating. For certain details, reference is made to U.S. Patent Application No. 61/206,661, entitled "Indium/Gallium Electrodeposition within Liquid Metal Resonator Methods and Chemistries," the contents of which are incorporated within in its entirety. Therefore, some preferred embodiments hereof rely on plating an interior surface of the acoustic cavitation resonator chamber with gallium, and other embodiments apply indium or indalloy material to the same.

The present system and methods are directed in part to avoidance of spatial voids, gaps, or other bubbles or gas formations between the liquid metal being cavitated and the inner surface of the acoustic resonator, for example a spherical resonator. In some embodiments, this avoids or reduces the loss of energy from the system, improves the system's acoustic characteristics, and permits cavitation in a liquid metal (e.g., gallium) within the resonator.

In one embodiment, the inner surface of the resonator is plated with gallium (or similar metal) prior to inducing cavitation. In this way, when the vessel is filled with gallium, there is a good bond between the liquid and the surface of the steel resonator walls. Procedures to plate gallium onto the interior surface of a resonator (e.g., a spherical resonator) or other surfaces (such as the system's fittings) have been developed by the present inventors and confirmed to aid cavitation and improve the quality of the resonator systems as is described herein. Before gallium plating, said resonator and system surfaces are preferably made substantially free of residues and oxides. The pre-plating cleaning process is carried out on the components that are to be plated.

Work pieces that may have residue from cutting oils (such as recently machined parts) are either submerged in methanol (small parts) or filled with methanol (resonator hemispheres and spherical resonators). In some embodiments, methanol is heated to temperatures between 35-40° C. for 10 minutes before use and is employed to remove such oil residues. The parts or hemispheres may be hot rinsed as well.

In some embodiments, the work pieces are immersed and agitated well in hot, de-ionized water to remove methanol and contaminants such as oils for a duration of on the order of tens of seconds to several minutes, enough time to fully remove the methanol solution at a temperature of 60-70° C. or more.

According to some embodiments, in order to smooth the surface in preparation to receive a deposition layer of gallium, the workpiece is then eletropolished. Work pieces to be electo-polished may be submerged in a bath (small parts) or filled (hemispheres and spheres) with an electrolytic solution comprised of Phosphoric Acid (H3PO4)—50%, Sulfuric Acid (H2SO4)—25%, and Water (H2O)—25%. Other electropolish solutions are not outside the scope of the present invention.

Figure 2:
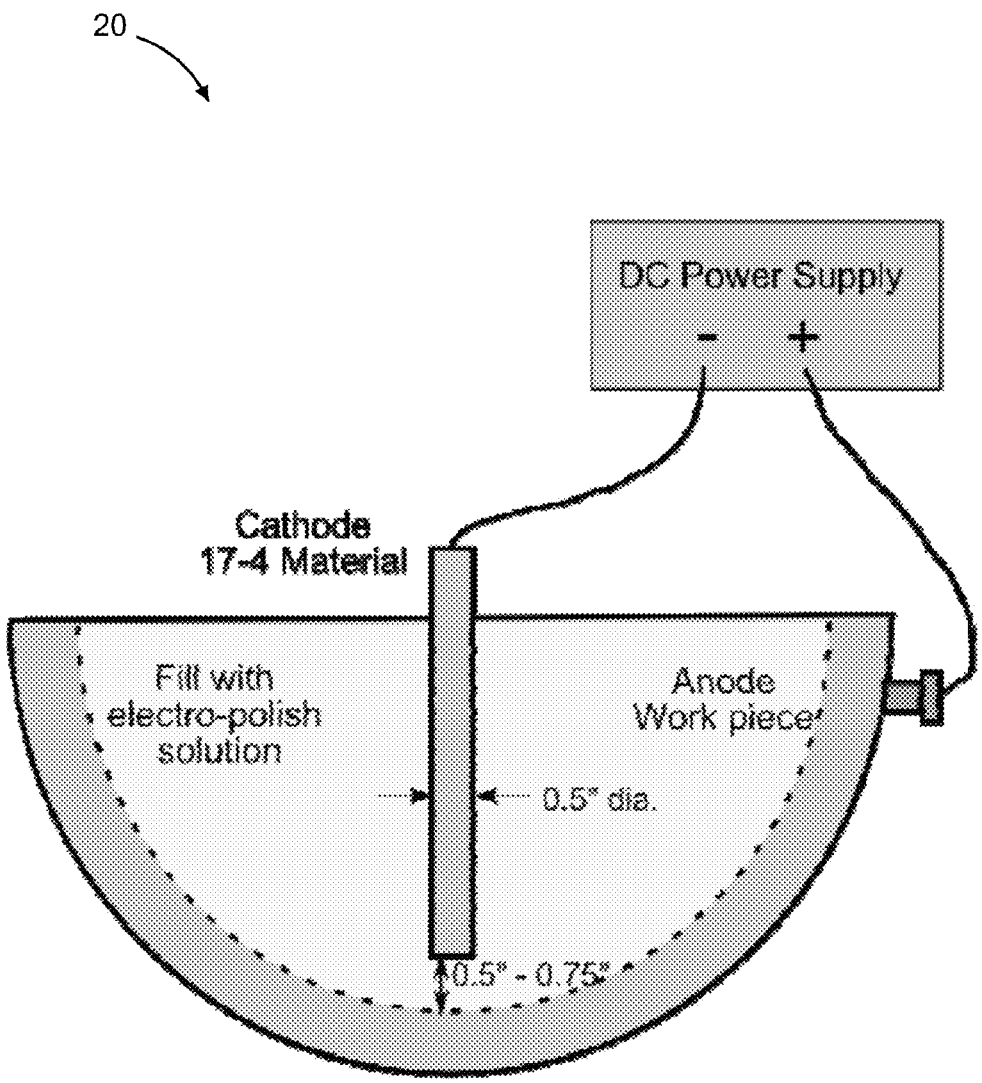
FIGS. 2-3 illustrate preparations for cavitation resonators for cavitating liquid metals.
Figure 3:
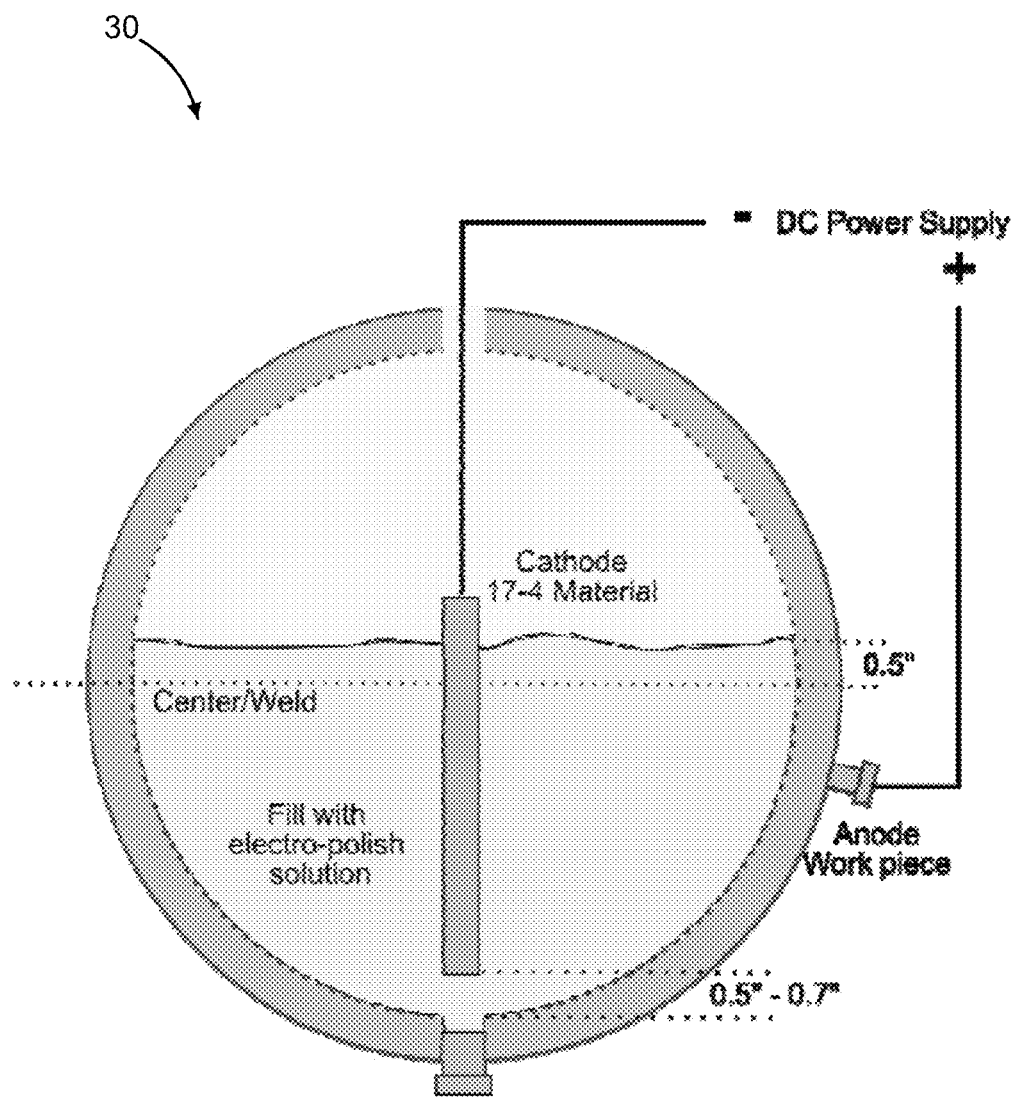

To cause electroplating of a desired substance onto said interior surfaces of said resonator, a DC power supply with a minimum available current of 20 A is connected to the work piece as shown in the FIGS. 1-3. Note that the parameters and examples provided herein are for illustrative purposes only, and shall not limit the scope or understanding of the invention. The present techniques for treating said resonators may also be applied to fittings and peripherals, accessories, or other parts that come into contact with the liquid metal under consideration.

FIG. 1 illustrates the disposition of a small workpiece such as the distal ends of a plug or valve. Connections to the anode and cathode that come in contact with electro-polish solution are made of the same material as work piece (17-4 stainless steel in FIGS. 2-3). When electro-polishing small parts such as coupons or fittings, the surface area of the cathode roughly matches that of the anode, or item to be polished. The geometry of the cathode is not critical and may vary. Elongated cylindrical shapes or rod-like shapes may be used. The drawings are not necessarily provided to scale, but rather, for illustrative exemplary purposes.

In the electroplating process, a power supply is voltage side controlled at e.g. 8 VDC. This voltage may vary, and a controller circuit may control a voltage or a current provided during said plating steps. Smaller work pieces such as fittings are electropolished for 1-2 minutes. Larger parts of the acoustic resonator, e.g., hemi-spheres or spheres are electropolished on the order of 6 minutes. Note that for a full sphere, one half of the vessel is electro-polished at a time. The process is repeated for each half. Of course, a resonator chamber that is made of one, two, or more parts prior to assembly and use may be treated all at once, or each part thereof may be treated separately.

Parts are hot rinsed again to remove the electropolish composition. The work piece is rinsed well in hot water (at a temperature between 60-70° C. for example, or greater). The rinse duration varies according to when the solution is determined to be removed. This can be confirmed by use of phenolphthalein, since the solution is generally acidic.

Workpieces may be further cleaned in some embodiments using an alkaline soap such as that known as Micro-90, which neutralizes remaining acid. Work pieces to be plated may either be submerged in a dilute (aqueous) Micro-90 solution or filled with a Micro-90 solution if larger than a small part. Filled work pieces should preferably be completely filled or touched by the solution, with the Micro-90 agitated sufficiently to clean the entire interior surface. Solution temperature may be in a range of about 70-80° C. for 15 minutes.

Parts are hot rinsed again to remove the Micro-90 solution. Work pieces are rinsed in hot water (at a temperature of 60-70° C., or greater, for example). In some cases, the rinse duration may vary according to when the solution tactilely determined by feel (parts covered in basic solutions are slippery to the touch). Items to be plated may be stored for a reasonable period of time at this point, e.g., 1-3 days. If more time passes before the item is plated, the cleaning steps can be repeated.

Care is taken to remove potential contaminants from any surface contacting the liquid metal or associated components. Some gas may still remain, trapped under a layer of the electrodeposited gallium. Moreover, chemical decomposition during a electro polishing and electroplated produces hydrogen and often oxygen gasses. As discussed, workpieces absorb hydrogen gas which can be released during cavitation. This is treated and avoided in various present embodiments.

Several preparation and electroplating methods are described herein to improve boundary layer conditions. The interface between the resonator chamber's interior walls and the liquid metal contained therein undergoing cavitation is important. Some or all present embodiments promote improved liquid metal (e.g., gallium) wetting to the stainless steel walls (e.g., 17-4 stainless steel). Stainless steel may form a chromic oxide layer thereon (especially 17-4 stainless steel), which makes plating materials onto the surface of such steel challenging. It is one object hereof to promote better plating procedures for use in acoustic cavitation systems that cavitate liquid metal.

Surface preparation is used to achieve a good plating result. In particular, some embodiments remove chromic oxide surface layers from the resonator chamber walls and from other components. Also, embodiments hereof immerse the work piece into a bath before the oxide layer has a chance to reform in an O2 (oxygen) atmosphere. Since gallium is liquid at just above room temperature and does not wet to stainless steel very well in the presence of an oxide layer on the base metal (stainless steel), gallium or another suitable metal is applied to said surfaces to promote wetting of the same by the liquid metal undergoing cavitation.

In some aspects, proper surface preparation prior to electroplating provides adequate adhesion and coverage of the deposited metal. The electroplating of metal (including gallium onto stainless steel and high refractory oxide metals such as aluminum and molybdenum) may benefit from special surface preparation procedures beyond those specifically enumerated herein, but such additional steps or alternative steps are within the scope of the present discussion and can be determined by those skilled in the art.

A liquid metal handling loop for containment and treatment is described for use in the present liquid metal cavitation systems. Some embodiments are directed to a system for containment and oxide removal and to maintain cleanliness of the bulk liquid metal. Handling of liquid metal can be complicated as gallium and the gallium alloys used can react with materials and gasses to create oxides and semi-solid material suspended within the liquid. Some embodiments reduce contaminants and improve the purity of the liquid environment by using a leak-tight liquid metal handling loop complete with pump, filter, valves for fluid control, fill and containment reservoirs, pressure gauges, electro-magnetic flow meter, and various inlet/outlet ports. The mechanical design is flexible enough to accommodate various size spheres with minimal re-fixturing.

A fluid handling loop including such fluid components as well as a chemical cleaning apparatus is also provided in some embodiments, and is used for chemical treatment of the liquid metal. An object of some embodiments of the present system is to provide a way to chemically treat liquid metal disposed in the liquid metal loop. Aspects hereof are therefore directed to a leak-tight liquid metal handling loop comprising a chemical treatment reservoir which acts an oxide/sludge trap, a pump, valves for fluid control, a fill reservoir, pressure gauges, electro-magnetic flow meter, and various inlet/outlet ports. The design is flexible enough to provide for gallium refilling substantially without the need to empty the chemical treatment reservoir, according to some embodiments.

In some aspects, the present invention uses self-contained, isolated or isolable liquid metal subsystems to deliver liquid metal to resonator to accord high Q numbers necessary to produce cavitation at high static pressures in liquid metals. Characterizing the resonance frequency, quality factor and cavitation response of the resonator system is discussed to verify and confirm the effectiveness of embodiments of the invention. This process may help to determine system performance with respect to the applied static pressure (Pstat) in the system. This analysis is used to increase the Q of the resonators and develop other technique/modification to increase the maximum static pressure at which cavitation is possible.

A resonant system generally repeats a behavior at substantially equally spaced intervals in time. This type of system can be assigned a quantitative value that tells how well the system stores energy. It is often useful to understand the response of a system in order to identify the preferred mode of operation of the resonator.

Figure 4:
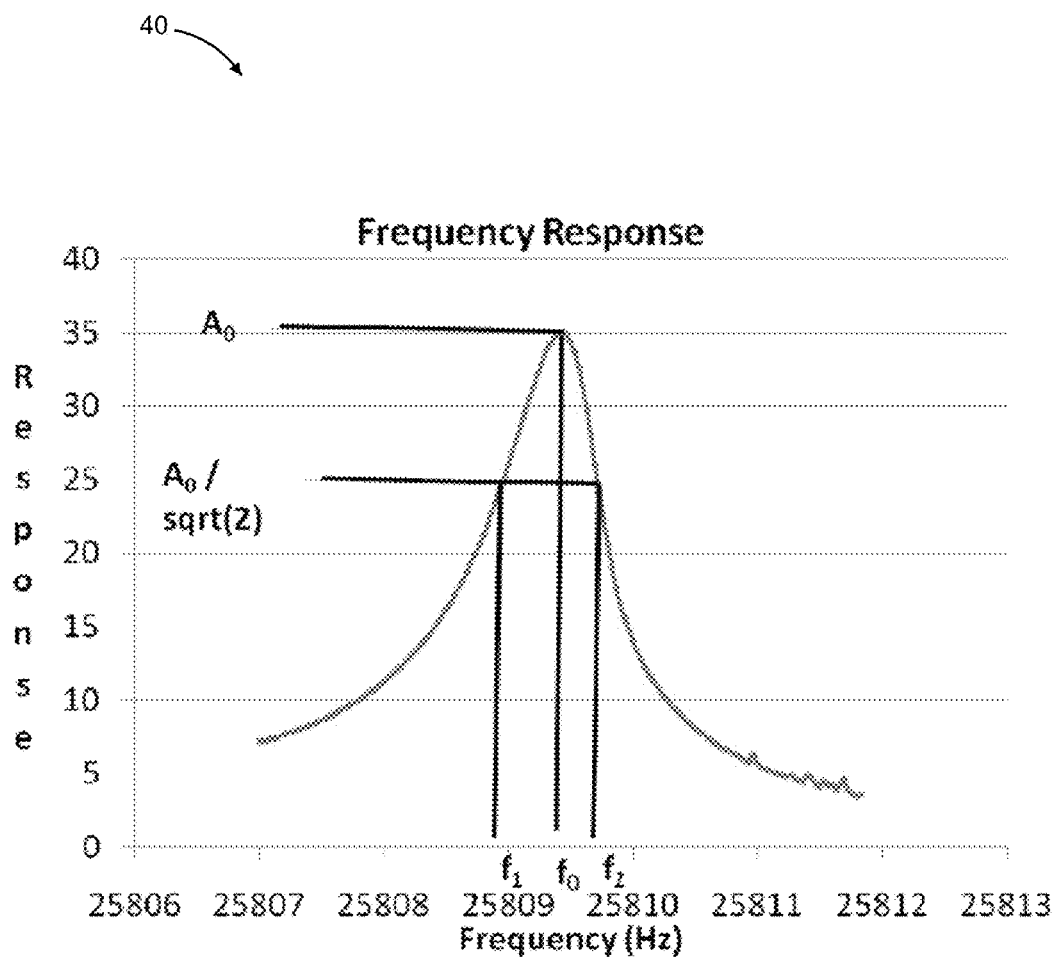
FIG. 4 shows a typical frequency response curve.

Acoustic resonance relates to a breathing mode (n=0) of a spherical cavitation resonator where cavitation occurs substantially near or at the center of the liquid in the sphere and is one preferred mode of operation of the spherical resonator. The presence of other nearby resonances can interfere with the acoustic mode by losing energy, therefore reducing the quality factor (Q) and preventing cavitation. To determine the Q of the system, a frequency sweep or drive of the resonant system across a frequency spectrum, including across the resonant frequency is done, and measurement of the amplitude of the response of the system at each particular frequency follows. From this, one may obtain a frequency response curve for the resonator and cavitation system. FIG. 4 shows a typical frequency response curve showing half power frequencies at maximum amplitude divided by square root of 2.

In some embodiments, in order to improve the accuracy and reliability of the Q measurement, an automated data collection procedure may be employed and an improved data set may be obtained. Over a range of static pressures, the cavitation threshold is found to be approximately quadratic with the static pressures. To obtain a lower limit to the cavitation threshold, a linear may be done to the lower static pressures. Improvements such as better impedance matching between the amplifier and driver can increase the maximum pressure at which cavitation takes place and may provide improved extrapolations in the data.

Figure 5:
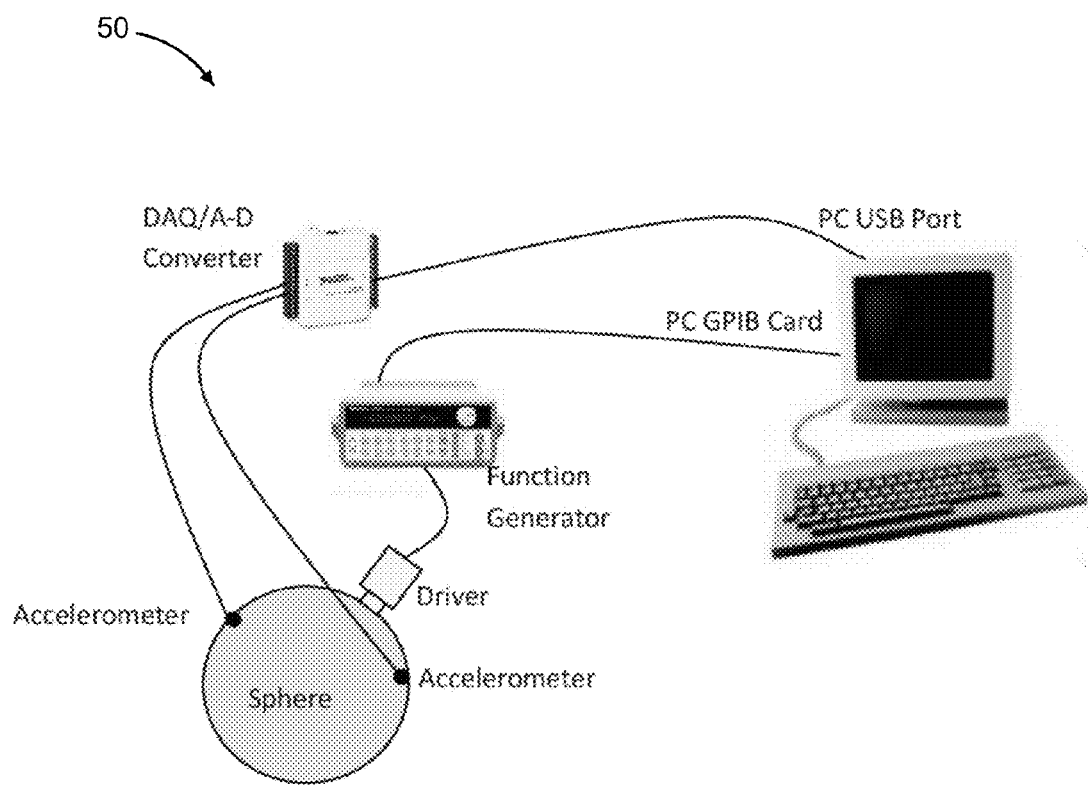
FIG. 5 illustrates a result of a semi-automated system for measuring Q in a liquid metal cavitation system.

FIG. 5 illustrates a result of a semi-automated system for measuring Q in a liquid metal cavitation system. Once the data has been collected it can be analyzed on a PC computer system or transferred to another machine or computer and analyzed there.

The measurement hardware requirement depends on how many signals are being analyzed and at how high a frequency. In one example, two channels are used for the driver, and one channel for each accelerometer.

For empty spheres, a quick sweep from 5,000 to 41,000 Hz at every 4 Hz may be run. Theoretical frequencies are superimposed on a response graph. Frequency ranges of interest may be manually chosen. Ranges of interest are swept at 5 points per Hz in one embodiment.

According to an embodiment, accelerometers are located at 45° from "North pole" of the spherical resonator and just above the weld seam at equator. Settling time is set to 80 to 120 ms. Driver voltage and accelerometer voltages are sampled, and a FFT (fast Fourier transform) is used to calculate Vrms. Normalized signal voltage versus frequency are plotted, and symmetric response curves are identified.

Figure 6:
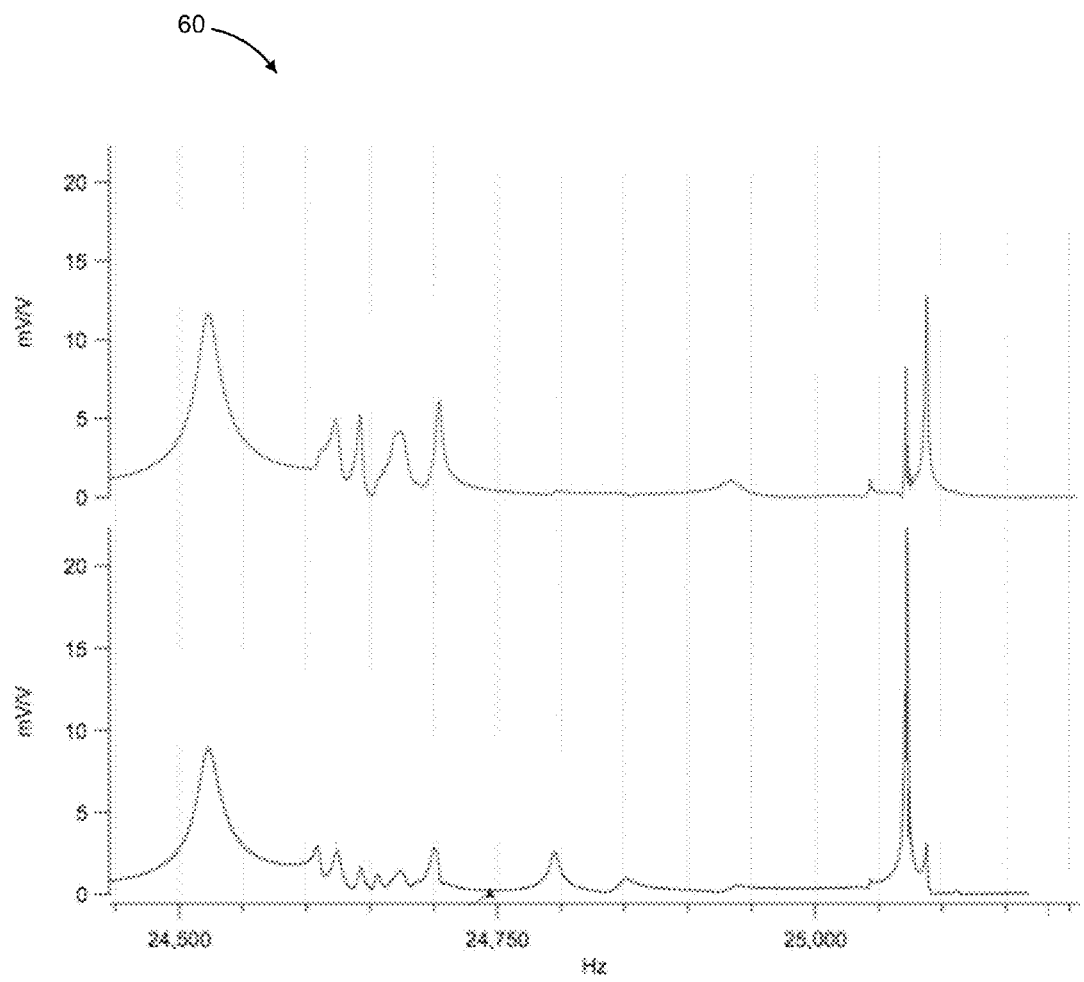
FIG. 6 illustrates a sample accelerometer signal plot.

FIG. 6 illustrates a sample accelerometer signal plot from 9.5" OD, ¾" wall spherical resonator where F=frequency at maximum response, f0=first frequency below maximum where signal=max/sqrt(2), f1=first frequency above maximum where signal=max/sqrt(2), f0 and f1 are calculated using linear interpolation between two straddling points, Q=F/(f1−f0).

Anodes are fabricated to suit the plating workpiece. When plating small parts such as coupons or fittings, the surface area of the anode is roughly that of the cathode, or item to be plated. In some embodiments, the geometry of the anode such that the electric field does not accumulate in discrete locations, such as, at the end of a point. Elongated cylindrical shapes (cigar shaped) are relatively simple to construct and work quite well.

Figure 8:
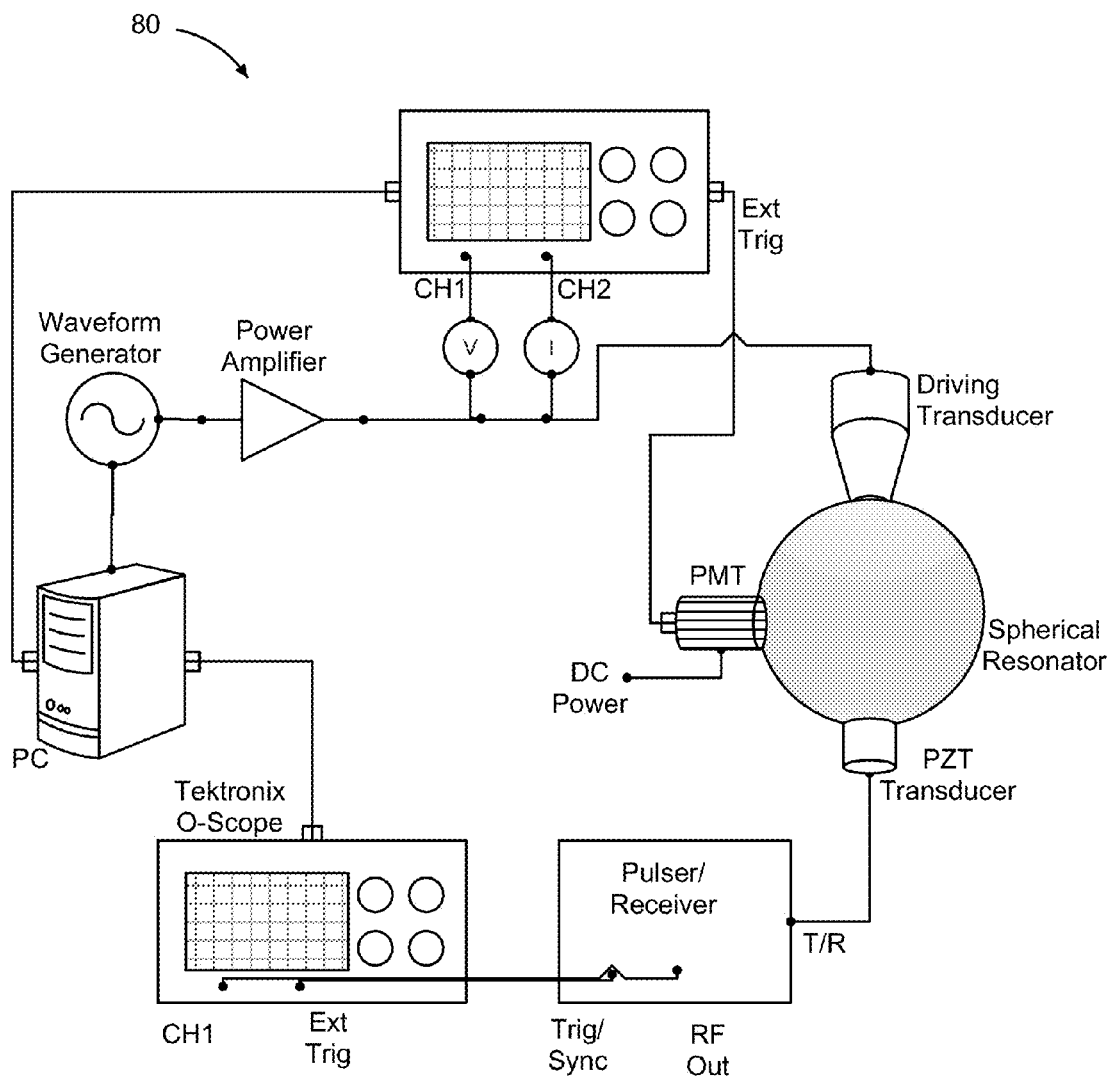
FIG. 8 illustrates placing a workpiece into a plating solution.

Prior to plating, and in some embodiments very soon or immediately prior to electroplating, the work piece may be activated by placement in an acid, e.g., HCl. This removes the passivation in order for the bulk to electrodeposited. The workpiece is rinsed in water, and then placed directly into the plating solution as shown in FIG. 8.

Figure 9:
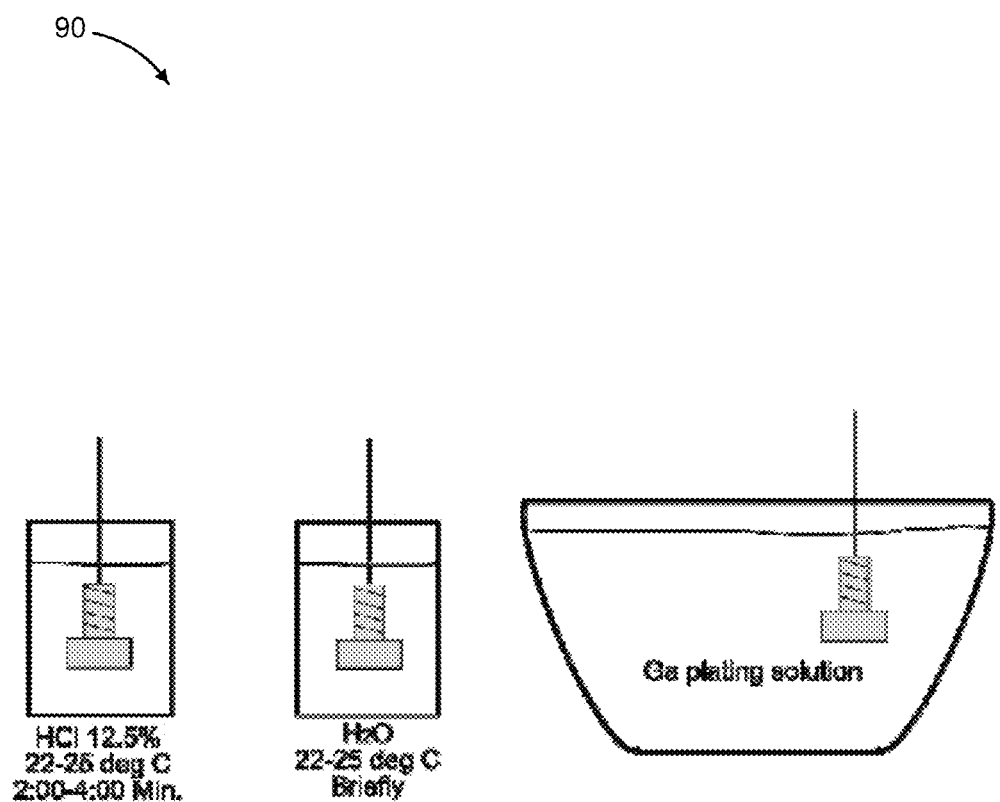
FIG. 9 illustrates a DC power supply to the anode and cathode.

A DC power supply to the anode and cathode as shown in FIG. 9. The DC Power Supply specifications in one embodiment are 24 A, 4.9 VDC in order to achieve a 30-35 A/sq. ft. current density. Plating time is 5-8 at this current density but varies in other embodiments.

Figure 10:
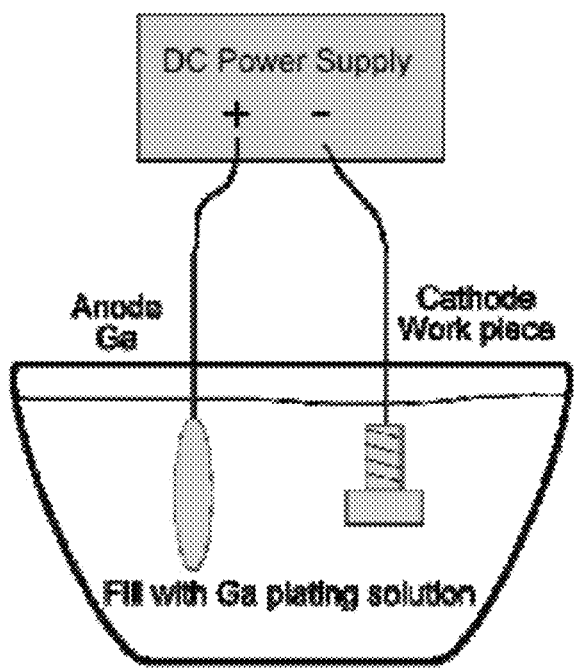
FIG. 10 illustrates DC power supply connections for plating small work pieces.

FIG. 10 illustrates DC power supply connections for plating small work pieces. The workpiece is well rinsed in hot water and dried thoroughly with a cloth or a wipe. This will clean off residue from the plating process.

Figure 7:
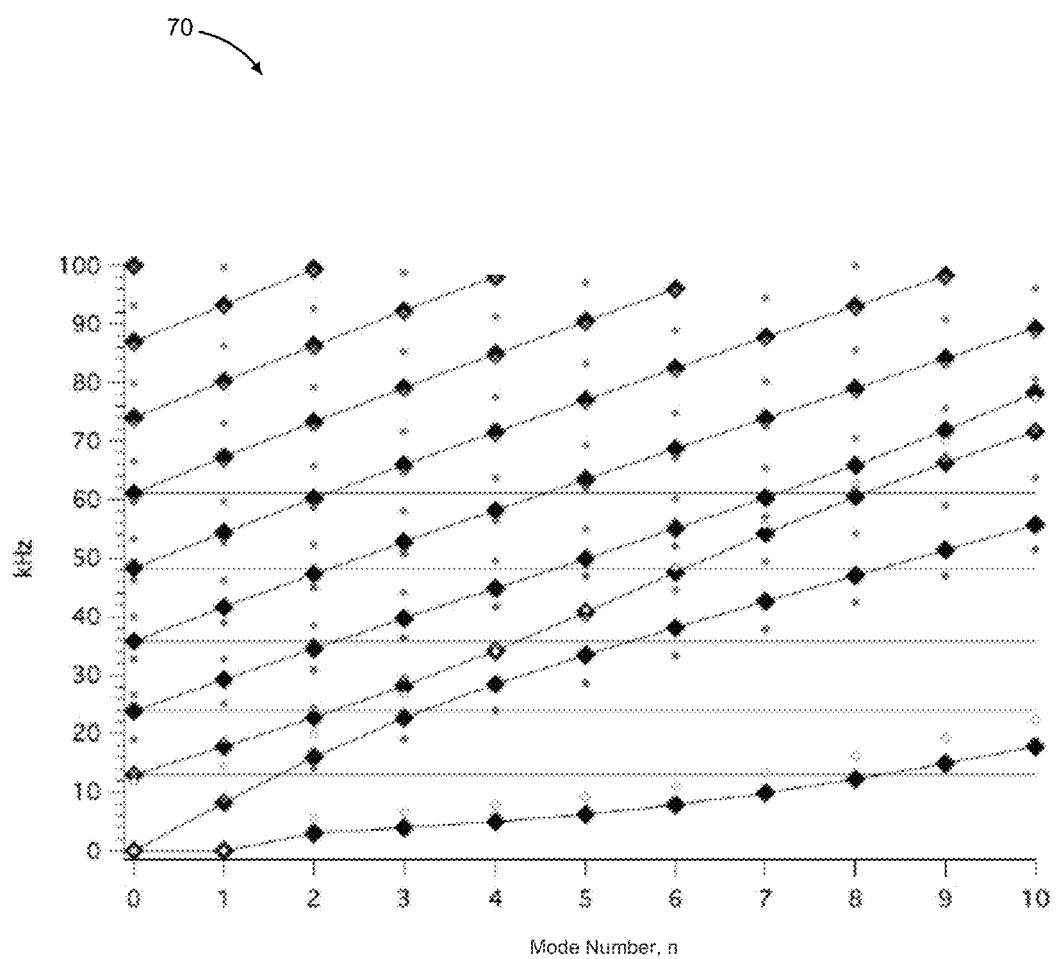
FIG. 7 illustrates a theoretical template of resonant modes.
Figure 11:
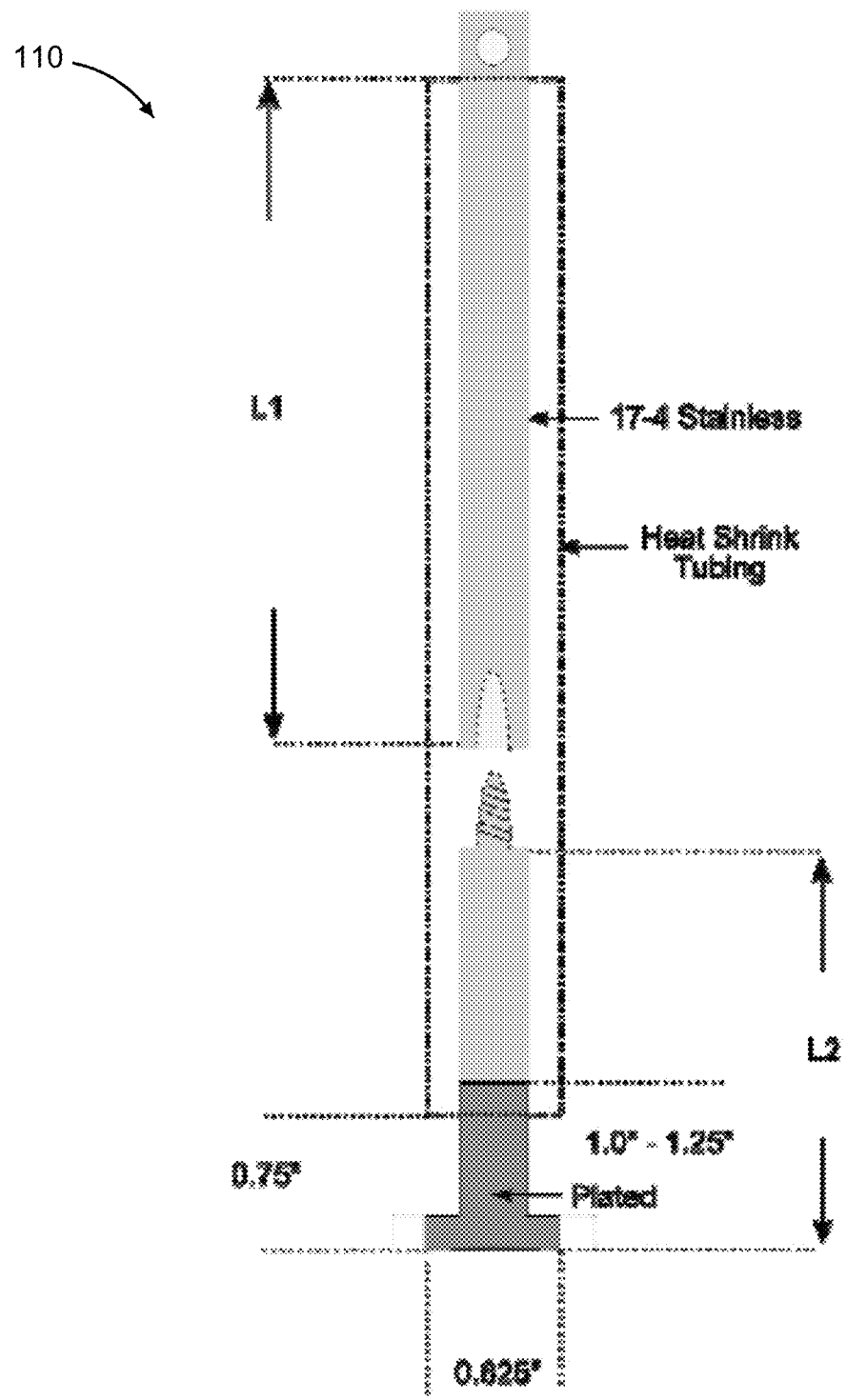
FIG. 11 illustrates a two-piece stainless steel rod for sphere plating anode according to one embodiment.

Before the sphere is activated for plating, the anode is fabricated. FIG. 11 illustrates a two-piece stainless steel rod for sphere plating anode according to one embodiment. A two-piece, 17-4 stainless steel rod similar to the diagram shown is machined. The distal portion of the rod is plated and wetted with liquid gallium. The rod is screwed together and then heat shrink wrap is applied such that the wrap goes down far enough to cover part of the plated section of the rod as shown. A theoretical template of resonant modes are graphed in FIG. 7.

The electroplating procedure is now discussed. Plating solution composition for all types of work pieces is as follows. In one embodiment the solution comprises 111 grams of NaOH (sodium hydroxide), powder form and 100 ml water (note: this is filled to a volume of 100 ml).

A nylon plug may be inserted into the bottom of the sphere and the "3rd hole" such that four threads of the holes are left free. Liquid gallium is poured into the sphere using a tube so that gallium is not splashed against the sides of the sphere.

Figure 12:
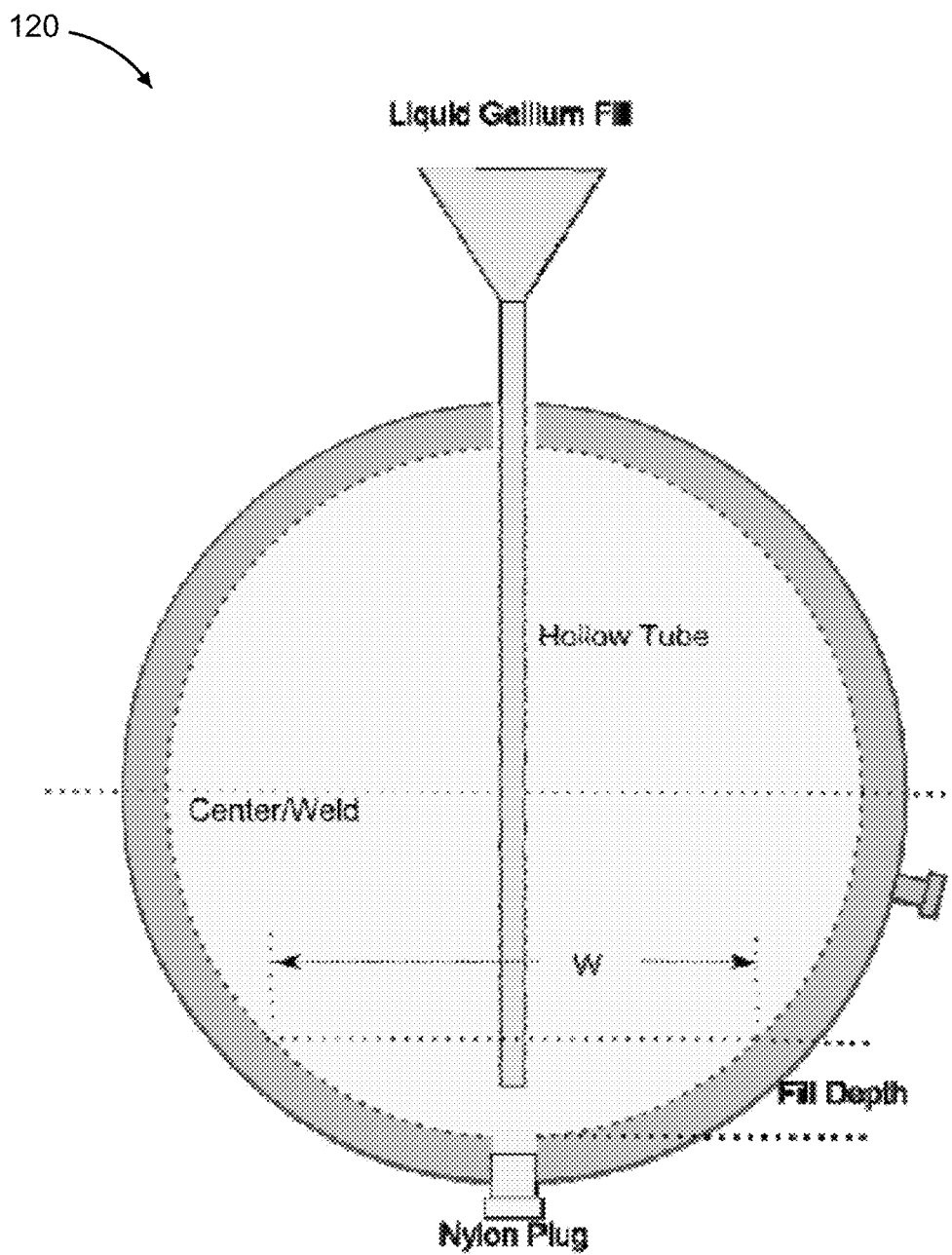
FIG. 12 illustrates a diagram of gallium fill and dimensions for whole sphere plating anode construction according to one embodiment.

FIG. 12 illustrates a diagram of gallium fill and dimensions for whole sphere plating anode construction according to one embodiment. The heat-shrunk stainless steel rod is inserted into the sphere. The sphere is leveled so that the rod is completely vertical and the liquid gallium will cool at a right angle to the rod. The rod is positioned over a bath of water for chilling.

Figure 13:
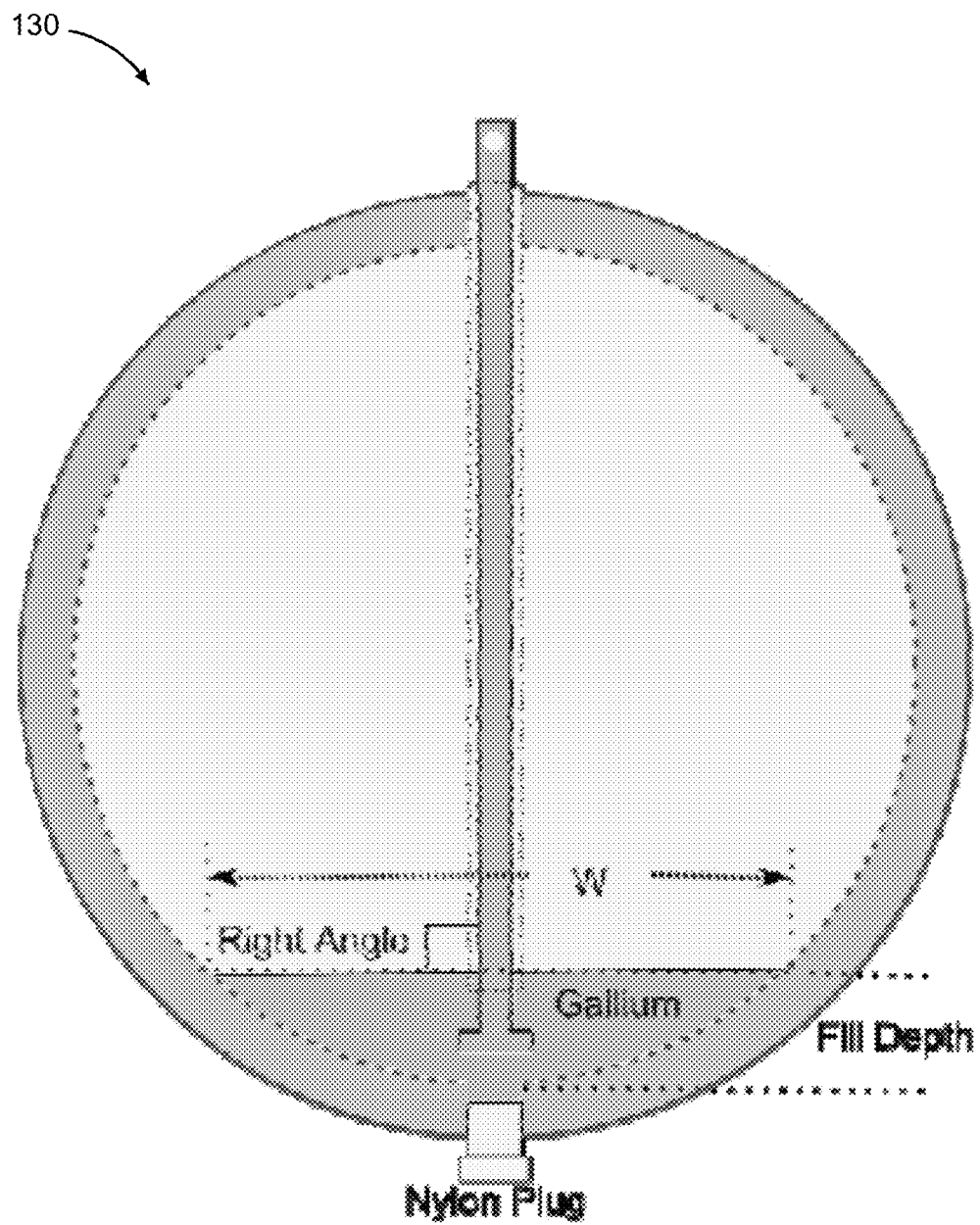
FIG. 13 illustrates an exemplary stainless steel rod and gallium of anode construction for whole sphere plating.

FIG. 13 illustrates an exemplary stainless steel rod and gallium of anode construction for whole sphere plating. The rod is securely in place until the liquid gallium is cooled to solid. This can be accomplished overnight (or in several hours) if the device was positioned on top of a cooling bath or device (~14° C.).

When the anode is cooled to solid, it is dislodged from the sphere. The nylon plug is removed. A small nylon spacer is inserted and, the plug reinserted. The bottom of the sphere is warmed and the plug screwed a bit tighter. The spacer pushes against the solid anode. Care must be taken not to warm the bottom of the sphere too rapidly, or apply too much torque while tightening the plug. Several iterations of warming/tightening before the anode dislodges from the surface of the sphere may be necessary.

In some cases, immediately prior to initiating the plating process, the sphere is activated with HCl (12.5%, 22-25° C., 2-4 minutes). The sphere is filled with HCl such that the weld seam is completely covered. The HCl is evacuated and rinsed with water (22-25° C.).

Figure 14:
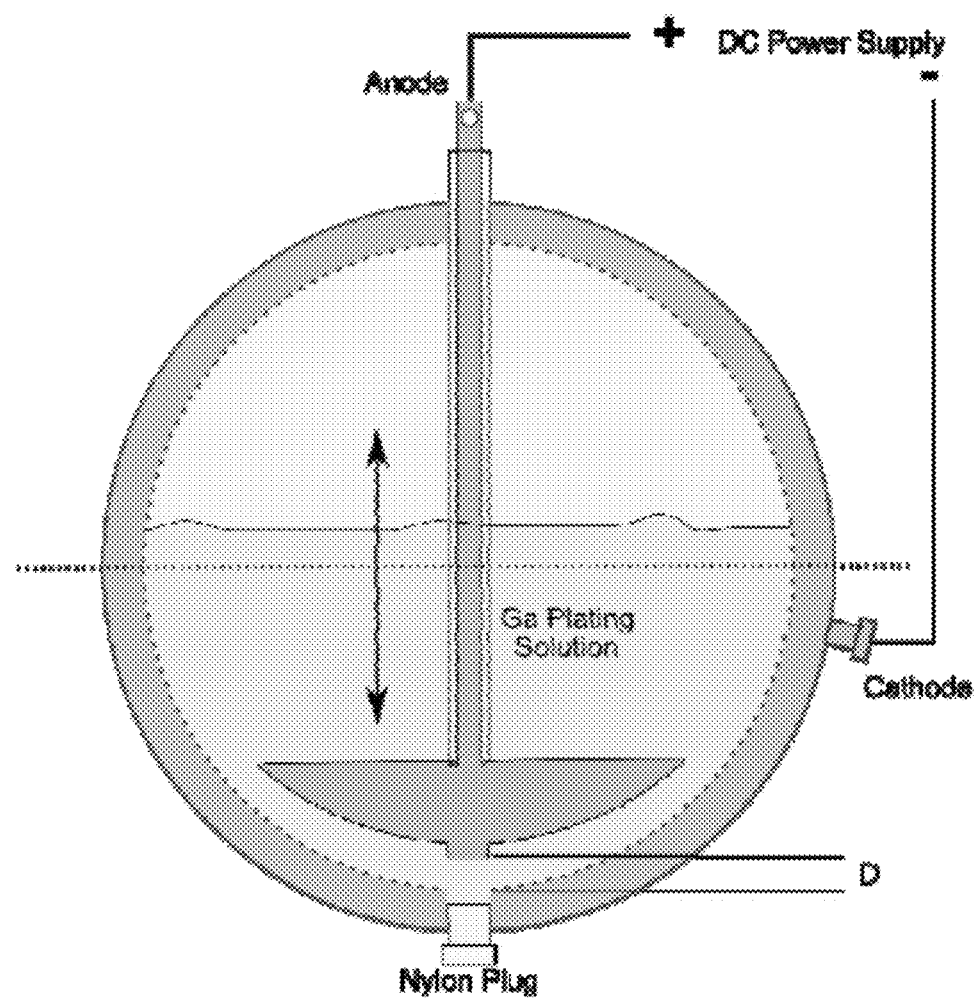
FIG. 14 illustrates filling a resonator chamber.

Half of the sphere is plated first, then the other half. The sphere is filled with plating bath solution to a depth sufficient to fully cover the welded seam as shown in FIG. 14, which shows plating solution and anode positioning for whole sphere plating process in one embodiment. The DC Power Supply specifications are 24 A, 4.9 VDC in order to achieve a 30-35 A/sq. ft. current density. Plating time is 5-8 at this current density.

The plating solution may be evacuated. The anode is pulled up through the top hole and carefully cut through the heat shrink wrap at the screw seam. The two parts of the stainless steel rod unscrewed and the anode (gallium portion) is returned to the sphere. The sphere is rotated 180° so that the anode covers the opposite hole.

The upper portion of the rod is inserted into the sphere and the two parts of the rod are screwed back together. The rod is pulled up and a small section of shrink tubing is reapplied around the cut seam of the rod. The sphere is rinsed well until the residual plating solution is removed.

The activation/HCl rinse and electroplating steps of the plating process are repeated on the second half of the sphere. After the second half of the sphere has been plated and rinsed, the sphere is dried in a 300° F. oven for 20-30 minutes under vacuum. The sphere is then analyzed using an residual gas analyzer (RGA).

If hydrogen evolution is significantly above background, vacuum baking can be lengthen to remove absorbed hydrogen which is produce during the electro polishing procedure. Unless the sphere is stored under an inert argon environment, the sphere may be filled with gallium or Indalloy within several hours to prevent oxidation.

Figure 15:
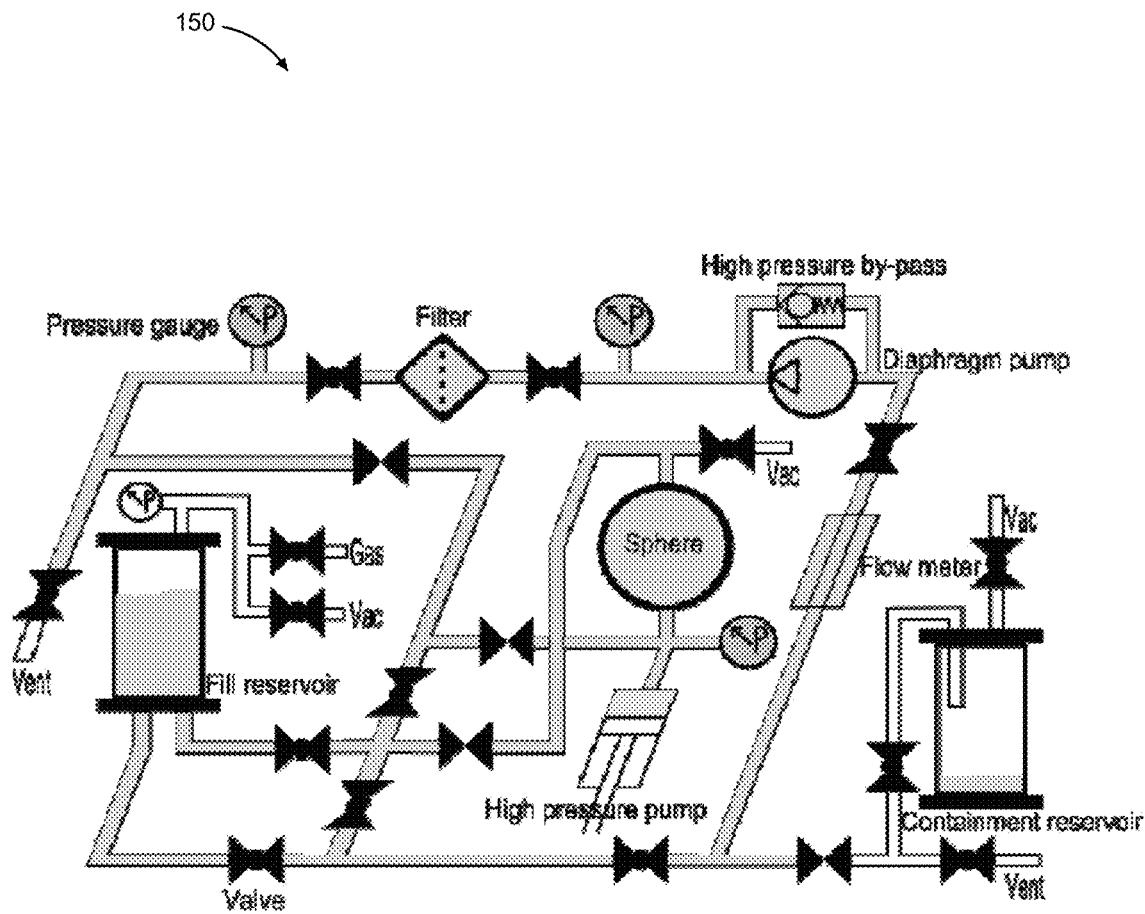
FIG. 15 illustrates a fluid handling loop according to some present embodiments.

Liquid gallium and gallium alloys can react with materials and gasses to create oxides and semi-solid material suspended within the liquid. In order to mitigate oxides and create a pure liquid environment, a leak-tight liquid metal handling loop is provided as in FIG. 15. The system comprises a pump, the inline filter, valves for fluid control, fill and containment reservoirs, pressure gauges, electro-magnetic flow meter, high pressure tubing, and various inlet/outlet ports.

The fluidics system is designed to do all gallium handling procedures in a closed system. Vacuum rated containers made of SAN plastic are specifically machined to accommodate an extra bottom port fitted with valves and a quick disconnect fitting to couple to the transfer tubing. The SAN plastic is reasonably compatible with HCl.

Various components of the loop are commercially available, while others have been machined in-house specifically for use on the handling loop. Heating tape is attached to all of the containers using Velcro and transfer tubing using cable ties. The diaphragm pump is manufactured by, e.g., KNF Neuberger, but other manufacturers/types are used in other embodiments. A key feature to prevent contamination is the Teflon diaphragm, which is the only element of the pump in contact with the liquid metal.

An electro-magnetic flow meter, e.g., as manufactured by Omega, monitors the flow and health of the gallium loop. The electro-magnetic meter uses the Hall effect to measure flow by the strength of the generated electric field to and has no moving parts in contact with the metal.

The filter is a cascade of individual filters in some embodiments, but those skilled in the art would appreciate various means of filtration. It begins with a 100 micron porosity element and cascades down to 30 micron elements in one embodiment. In an embodiment, this is a two filter system. But in other embodiments it can be a greater plurality of different sizes.

A high pressure pump, e.g., from HiP, is used to increment the static pressures to 300 bar. Most connections and valves are e.g. provided from Swagelok, but the above examples are of course merely illustrative. The reservoirs are made using glass tubing with KF-100 end caps.

Figure 16:
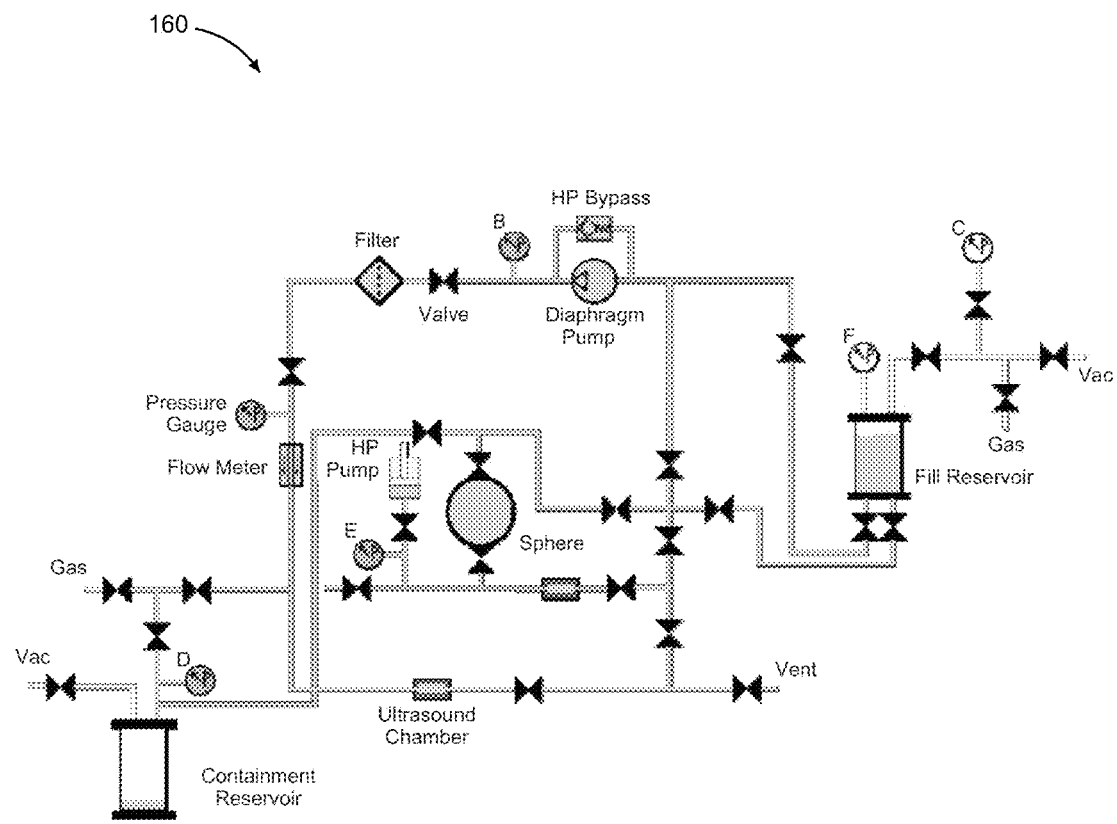
FIG. 16 illustrates another exemplary embodiment of an apparatus for liquid metal handling in a liquid metal cavitation system.

FIG. 16 illustrates another exemplary embodiment of an apparatus for liquid metal handling in a liquid metal cavitation system. All piping shown is stainless steel in the shown example, as are the valves and the ultrasound chambers. The sphere represented in the diagram is a 6" OD, 0.5" thick wall stainless steel, welded resonator. The liquid metal used is pure gallium. But, in other embodiments, it can be a gallium alloy, such as Indalloy. Such other metals are generally suited for substitution in the described embodiments that call out gallium by way of illustration throughout. Static fluid pressure to the resonator is controlled via the high pressure pump and monitored via pressure gauge "E". Note that all piping, reservoirs, and the sphere may be kept at a temperature greater than 29.9° C. (85.8° F.), which is the melting point of gallium. Electric heating tape is used throughout the system as required.

The sphere used in this system is a 6" OD, 0.5" thick walled, stainless steel welded sphere. High pressure, custom, e.g., "Miller" valves are on the top and bottom of the sphere and can be used to close the sphere off from liquid flow if desired. A temperature sensor was affixed to the sphere and monitored with the data acquisition system. A stainless membrane hydrophone is mounted at the inner cavity wall for cavitation detection, along with two additional ultrasound transducers described below. The sphere is configured with a high pressure relief valve to protect from over-pressure situations.

The acoustic driver used was a modified, 25 kHz driver. In one embodiment, the drivers have a single layer ceramic piezo. In other embodiments, these were built with quad crystals for improved acoustic energy transfer. The driver is connected to the amplifier via a custom transformer in order to lower their impedance.

Figure 17:
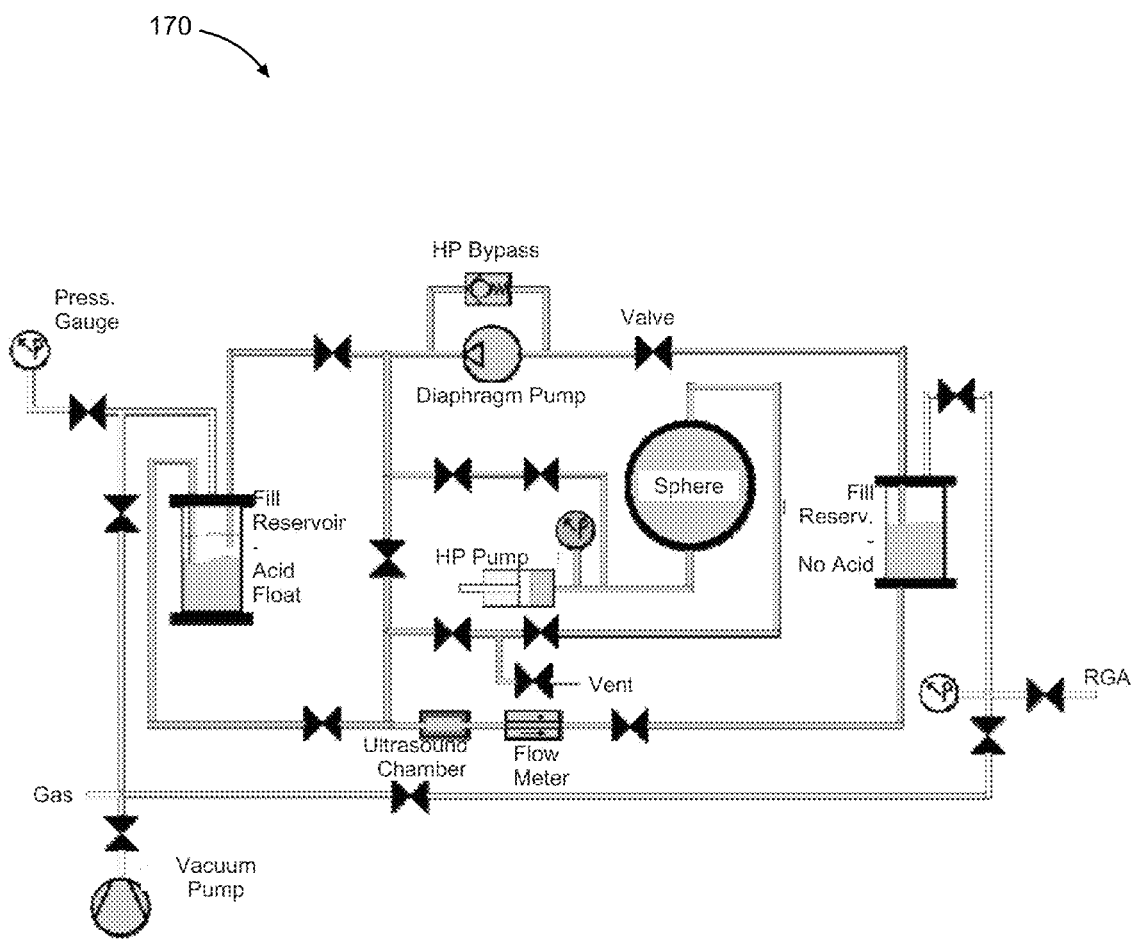
FIG. 17 illustrates another exemplary embodiment of the present system.

FIG. 17 illustrates another exemplary embodiment of the present system. All piping shown is stainless steel, as are valves and the ultrasound chambers. The sphere represented in the diagram is a 9.5" OD, 0.75" thick wall stainless steel, welded resonator that was gallium plated on the interior. The liquid metal used is pure gallium. Pressure to the resonator is controlled via the high pressure pump and monitored via the pressure gauge. Note that all piping, reservoirs, and the sphere are kept at a temperature greater than 29.9° C. (85.8° F.) in this embodiment, which is the melting point of gallium. Electric heating tape is used throughout the system as required.

The sphere used in this system is a 9.5" OD, 0.75" thick walled, stainless steel welded sphere. High pressure, custom, e.g., "Miller" valves are on the top and bottom of the sphere and can be used to close the sphere off from liquid flow if desired. A temperature sensor was affixed to the sphere and monitored with the data acquisition system.

A bath containing about 200 ml of 25% HCl diluted in ethanol is employed in one embodiment. It is previously subjected to a vacuum pump and then connected to a cylinder of argon. The gallium is allowed to trickle down from the top of the bath container down through the HCl.

After the entire sample has dripped through the bath, it is allowed to settle. Then the bath container is disconnected and then transferred to the top of the rack where the gallium is drained into a clean container (also vacuum-subjected, back filled with Ar, and placed at the bottom level of the rack). The draining was stopped before any HCl reached the drain of the bath.

In some embodiments, the gravity feed method may be an efficient means of transferring and chemical treatment of liquid gallium.

In the present embodiment, the left reservoir contains gallium with an acid/ethanol solution floated on top (based on relative densities). The acid, dilute HCl, chemically treats the gallium by reacting with the gallium oxides. By heating the bottom, thermal convection draws the oxides through the bulk to the top where it reacts with the acid.

The egress of the reservoir is disposed in the center of the fluid bulk. This prevents acid and dense sludge from entering the loop. The ingress of the reservoir is located at the top above the acid layer in some embodiments.

The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure. The claims are intended to cover such modifications.

What is claimed is:

1. A method for causing cavitation of a liquid metal in an acoustic resonator, comprising:
   cleaning an interior surface of said resonator;
   removing oil deposits from said interior surface using a heated methanol solution;
   removing oxide substances from said interior surface of said resonator; and
   plating said interior surface with a same metal as said liquid metal to be cavitated.

2. The method of claim 1, further comprising heating said methanol to a temperature above about 35 degrees Celsius and applying said methanol to said interior surface for a time duration greater than about 10 seconds to allow said methanol to remove said oil deposits.

3. The method of claim 1, further comprising rinsing said internal surface with heated de-ionized water to remove said methanol after use of said methanol.

4. The method of claim 1, further comprising a step of removing intermetallic substances from said acoustic resonator and associated components.

5. The method of claim 1, said plating comprising electroplating.

6. The method of claim 5, further comprising controlling an electrical current used for said electroplating.

7. The method of claim 1, further comprising electropolishing of said internal surface of said acoustic resonator.

8. The method of claim 7, comprising electropolishing with a solution containing any of: phosphoric acid or sulfuric acid.

9. The method of claim 7, further comprising rinsing said internal surface so as to substantially remove said electropolishing solution therefrom.

10. The method of claim 9, further comprising rinsing said internal surface using a hot water solution containing phenolphthalein.

11. The method of claim 9 further comprising rinsing said internal surface using an alkaline soap solution.

12. The method of claim 9, further comprising covering substantially all of said internal surface with a solution heated to a temperature above about 70 degrees Celsius.

13. The method of claim 1, further comprising carrying out said steps on an internal surface of a substantially spherical acoustic resonator.

14. The method of claim 1, further comprising carrying out said steps twice, once on each of two parts of said acoustic resonator.

15. The method of claim 14, comprising carrying out said steps on two substantially hemispherical halves of said acoustic resonator.

16. The method of claim 1, said removal of said oxide comprising removal of a chromic oxide surface layer from said internal surface of said resonator.

17. The method of claim 5, comprising providing an anode of gallium and using a cathode workpiece in said electroplating step, and further comprising placing said anode and said cathode within a gallium electroplating solution.

18. The method of claim 1, further comprising introducing a plating solution into said acoustic resonator by way of a tube having one end thereof arranged to receive said solution from a source of said solution and another end thereof proximal to said interior surface of the resonator to minimize splashing of said solution.

19. The method of claim 1, further comprising substantially filling said resonator with a liquid metal upon plating said sphere so as to minimize exposure of said interior surface to unwanted chemical reactants.

* * * * *